United States Patent [19]

Gruber et al.

[11] Patent Number: 4,995,585
[45] Date of Patent: Feb. 26, 1991

[54] SANITARY FITTING

[75] Inventors: Walter Gruber, Stuttgart; Horst Maag, Schonaich, both of Fed. Rep. of Germany

[73] Assignee: Hansa Metallwerke AG, Stuttgart, Fed. Rep. of Germany

[21] Appl. No.: 246,794

[22] Filed: Sep. 20, 1988

[30] Foreign Application Priority Data

Sep. 21, 1987 [DE] Fed. Rep. of Germany ....... 3731679
May 30, 1988 [DE] Fed. Rep. of Germany ....... 3818342

[51] Int. Cl.$^5$ .......................... F16K 31/40; E03C 1/05
[52] U.S. Cl. ............................. 251/30.03; 251/30.01; 251/129.04; 251/129.11; 4/623
[58] Field of Search ............... 251/30.01, 30.02, 30.03, 251/129.04, 129.11, 30.04, 30.05; 4/623

[56] References Cited

U.S. PATENT DOCUMENTS

| | | | |
|---|---|---|---|
| 3,023,996 | 3/1962 | Robertson | 251/38 X |
| 3,151,340 | 10/1964 | Teshima | 251/129.04 |
| 3,667,722 | 6/1972 | Katz et al. | 251/30.04 |
| 4,090,532 | 5/1978 | Story, Jr. | 251/129.04 |
| 4,729,544 | 3/1988 | Baumann | 251/129.11 X |

FOREIGN PATENT DOCUMENTS

3507144 9/1985 Fed. Rep. of Germany .

Primary Examiner—Arnold Rosenthal
Attorney, Agent, or Firm—Fred Philpitt

[57] ABSTRACT

In a sanitary fitting which is controlled without physical contact at least one sensor is provided through which the water flow can be continuously adjusted. A pilot controlled valve is used for this which is operated by an electric motor. The rotation of the electric motor output shaft is converted into the linear movement of a plunger. This plunger in turn operates a closing device which opens or closes the pilot opening of a membrane. The membrane acts together with a valve seat to regulate the actual water flow. The design of the valve is such that in all positions between the fully open and fully closed position the membrane reliably follows the position of the closing device. Thus a continuous adjustment of the water flow is possible by using minimum power.

10 Claims, 7 Drawing Sheets

SANITARY FITTING

DESCRIPTION

The invention refers to a sanitary fitting which is controlled without physical contact, with:
(a) at least one valve through which the quantity of the water flowing through the sanitary fitting is continuously variable;
(b) at least one sensor and a monitoring area for this sensor, whereby the position of the valve is changed if an object enters or leaves the monitoring area.

The design can be such that the position of the valve is varied continuously as long as an object is located in the monitoring area or such that the valve is moved to a preselected position when an object enters or leaves the monitoring area.

As the electrical components which form part of an existing sanitary fitting are operated via the mains network this does not produce any problems. The necessity to connect, to the electrical mains network, fittings which are controlled without physical contact however shows itself increasingly as an obstacle hindering the introduction of such highly convenient fittings. On the one hand subsequent installation is very difficult, in particular if all cables must be laid below surfaces. On the other hand such sanitary fittings involve the specialist skills of two different trades, i.e. plumbers and electricians. This complicates both the installation and the maintenance of such fittings.

The objective of the above invention is to provide a sanitary fitting of the type stated at the outset but which requires the lowest possible power and therefore can be operated by batteries, perhaps supported by solar cells or Peltier components.

In the invention this task is solved by the fact that
(c) the valve is a pilot controlled valve and includes:
  (ca) a membrane which acts together with a valve seat and which moves relative to the valve seat under the influence of the water pressures on both sides and possesses a pilot opening;
  (cb) a closing device which can be applied to or removed from the pilot opening of the membrane and which is operated by a plunger which moves in a linear manner;
  (cc) an electric motor whose output shaft rotates;
  (cd) a device which converts the rotary movement of the output shaft into a linear movement of the plunger.

A valve according to the invention is characterised by an extraordinarily low power consumption since the actual work in controlling the water flow is provided by the water pressure itself and the valve only requires current to change its position whilst it can remain de-energised in all opening positions as long as it is not moving. Surprisingly it has shown that such valves are suitable for the continuous adjustment of the water flow because the membrane also follows the closing device in all its intermediate positions and is able to take up stable positions. This was not known in existing pilot controlled valves in the past.

In a special design of the invention there are two sensors whereby the presence of an object in the area monitored by the first sensor results in the electric motor being moved in a direction which corresponds to an increase in the water flow and the presence of an object in the area monitored by the second sensor adjusts the electric motor in a direction corresponding to a reduction in the water flow.

The principle of the invention can also be used to design mixing valves. In this case there are two independent pilot controlled valves, one of which adjusts the cold water flow and the other the hot water flow, whereby at least one separate sensor is allocated to each.

In a preferred design of the invention an additional sensor is provided, whereby all valves are moved in a preferred opening stroke when an item enters the area monitored by the additional sensor and all valves are moved to the closed position when the item leaves the area monitored. With the aid of this sensor it is therefore possible to operate the sanitary fitting in a manner corresponding to that used in conventional contactless fittings without flow control: When the item (the hand of the user or the user himself) enters the area monitored by the additional sensor the water begins to flow at a preferred rate. Only if the user does not find this flow rate satisfactory is the water flow adjusted individually according to the user's requirements by activating the first or perhaps also the second sensor accordingly.

For this, it is an advantage if in one mode of operation the two sensors which serve to increase or reduce the water flow can be used to adjust the preferred opening stroke.

In a special design of the invention the electric motor is a DC motor.

For this, the DC motor is preferably supplied with pulsed DC current. Depending upon the scanning ratio it is therefore possible to reduce the rotation speed of the DC motor to provide a fine and convenient adjustment of the required water flow.

Alternatively also a stepping motor can be used whose output shaft rotates through a specific angle upon each electrical pulse received.

The stepping motor can be uni-directional, i.e. rotating in just one direction. In this case one sensor is sufficient for adjusting the position of the valve. The gear must be designed so that the closing device is periodically moved backwards and forwards between its two end positions. Such uni-directional stepping motors are particularly simple to manufacture and economic in use.

Alternatively the stepping motor can be bi-directional. In this case two sensors are provided whereby if an object is present in the area monitored by the first sensor the stepping motor is moved in a direction which corresponds to an increase in the water flow and if an object is present in the area monitored by the second sensor the stepping motor is moved in a direction which corresponds to a reduction in the water flow. This design of the invention is more convenient as it is possible to reverse the movement of the membrane immediately, with the valve in any position, without first having to pass through one of the two extreme positions. This latter case may be necessary with uni-directional stepping motors.

Finally the invention generally involves the use of a pilot controlled valve with:
(a) a membrane which acts together with a valve seat and which moves relative to the valve seat under the influence of the water pressures on its two sides and which possesses a pilot opening;
(b) a closing device which can be applied to or removed from the pilot opening of the membrane and which is activated through a plunger which moves in a linear manner;

(c) an electric motor whose output shaft rotates;
(d) a device which converts the rotary movement of the output shaft into a linear movement of the plunger for the continuous adjustment of a flow. The invention uses the surprising characteristic of the pilot controlled valve which is stable in all intermediate positions.

One design example of the invention is described in more detail below with the aid of the drawings. These show.

Figure 1:
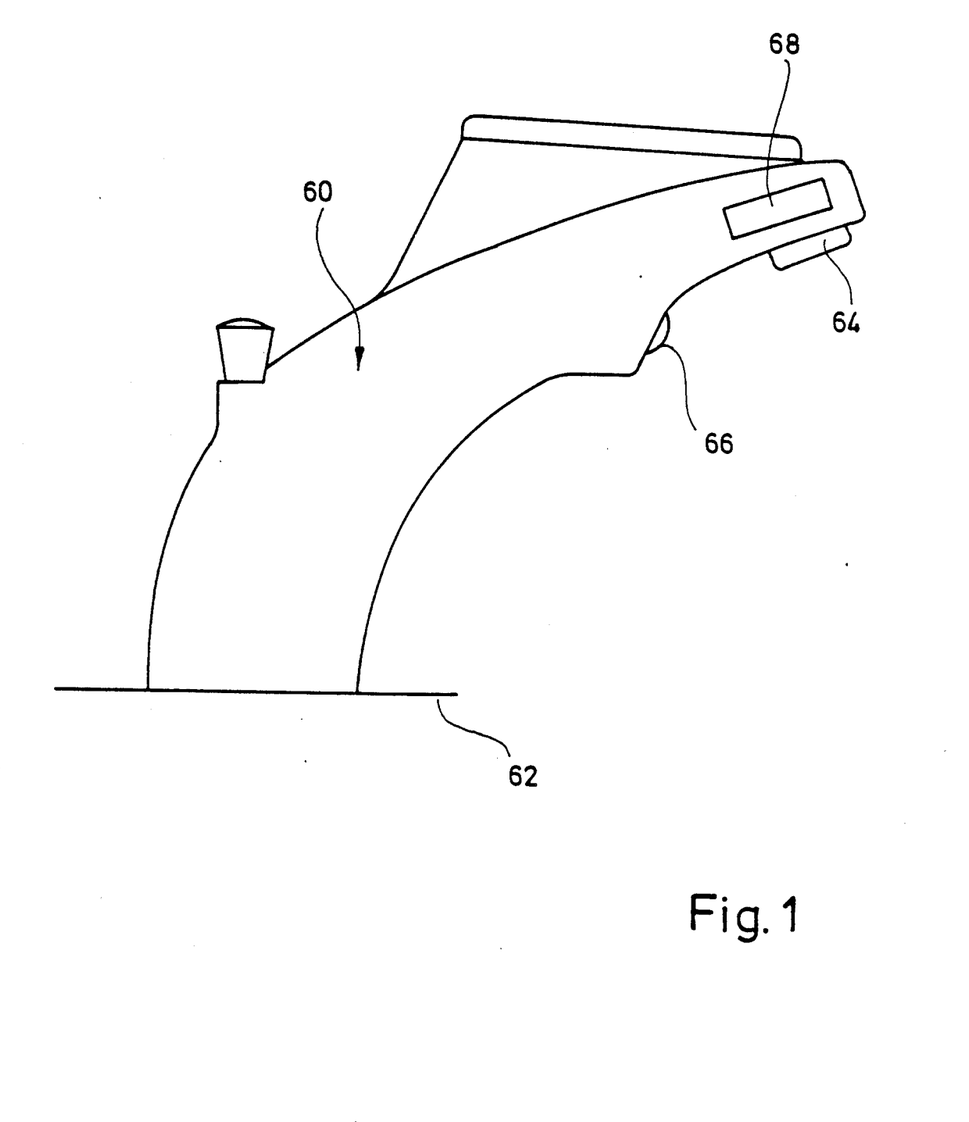
FIG. 1: the side view of a sanitary fitting controlled without physical contact.

FIG. 1 shows the side view of a sanitary fitting (60) which is fitted in the usual way into a wash hand basin (62) or similar. It includes an outlet (64), two side sensors (68) (of which only one is visible in the diagram) as well as a front sensor (66) directed towards the user of the sanitary fitting (60). Inside the sanitary fitting (60) there is a pilot controlled valve which is described in more detail below and which is used for the continuous adjustment of the water flow from the outlet (64) as well as the electrical components including a battery required for operation.

Figure 2:
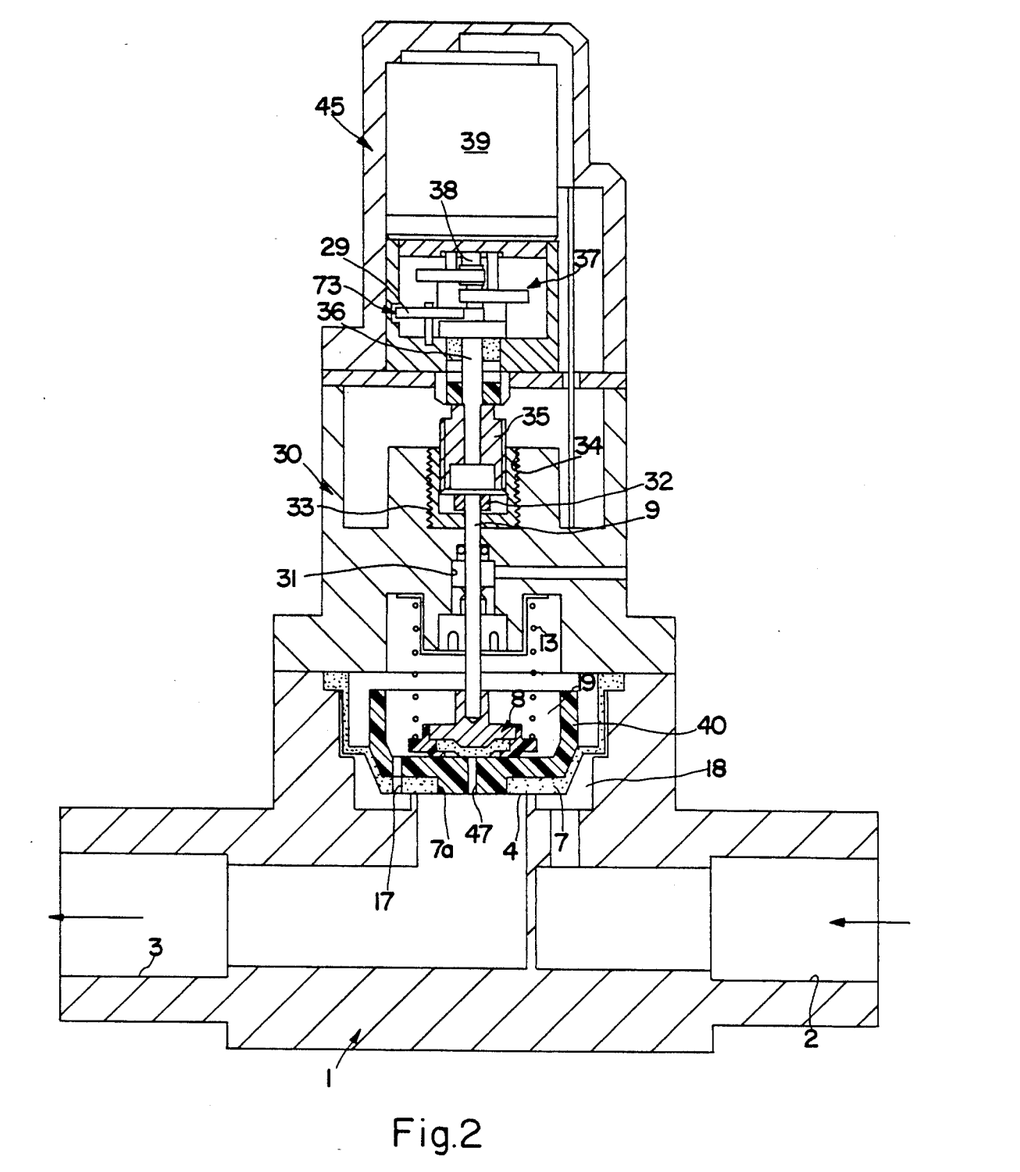
FIG. 2: an axial cross-section through a first embodiment of a pilot controlled valve which is used in the sanitary fitting shown in FIG. 1.

The pilot controlled valve is shown in a cross-section in FIG. 2. This includes a casing (1) with an inlet opening (2) and an outlet opening (3). In the flow path between the inlet opening (2) and the outlet opening (3) there is a valve seat (4) fixed permanently to the casing and onto which is fitted a cup shaped membrane (7). There is a moulding (40) attached to this on the side away from the valve seat (4). The edge of the membrane (7) is clamped between one shoulder of the casing section (1) and a further casing section (30) applied to this. It therefore seals the two casing sections (1, 30) simultaneously.

The moulding (40) has a central pilot opening (47) located coaxially to a larger central opening (7a) in the membrane (7). The pilot opening (47) can be closed by a closing device (8) which is fitted at the end of a plunger (9). The closing device (8) is under the pressure of a thrust spring (13) which is supported on a part of the casing (30). The opening movement of the membrane (7) is restricted by the fact that the moulding (40) presses against the lower surface of the casing section (30) shown in the drawing.

Radially outwards from the vale seat (4) on the membrane (7) as well as on the moulding (40) there is a pressure compensation opening (17) which connects a chamber (18) connected to the inlet opening (2) to a pressure compensation chamber (19) formed between the membrane (7) and the casing section (30).

The plunger (9) passes through an axial stepped hole (31) in the casing section (30) as well as through various seals provided here (no references given). A carrier ring (32) is provided at its upper end. The carrier ring is surrounded by a cup shaped screw section (33) which is open to the top whereby the plunger (9) also passes through its base. The screw section (33) is fed axially through an axial hole (34) of the casing section (30) and is screwed onto the male thread of a cylindrical part (35).

The cylindrical part (35) is secured to the drive shaft (36) of a gear (37). The input shaft (38) of the gear (37) is rotated by a bi-directional DC motor (39). The gear (37) as well as the DC motor (39) are located within a third section of the casing (45) mounted on the top surface of the casing section (30).

The operation of the valve shown in FIG. 2 is as follows:

If the DC motor (39) is supplied with current of a certain polarity then the input shaft (38) of the gear (37) and—reduced accordingly—the drive shaft of the gear (36) are rotated in a certain clockwise direction. This means that also the cylindrical part (35) turns in the sense stated. Due to the threaded connection between the cylindrical part (35) and the screw part (33) the latter moves axially within the hole (34) in the casing section (30), for example upwards. Upon this upward movement of the screw section (33) the plunger (9) is moved upwards by the carrier ring (32), whereby the closing devide (8) is lifted slightly off the pilot opening (47) against the thrust of the spring (13). Water can thus flow through the pilot opening (47). Water also flows through the pressure compensation opening (17) into the pressure compensation chamber (19). However, the cross-section of the pressure compensation opening (17) is smaller than that of the pilot opening (47) so that less water can flow through the pressure compensation opening (17) into the pressure compensation chamber (19) than flows off through the pilot opening (47). Thus the pressure in the pressure compensation chamber (19) is reduced. The pressure of the water on the inlet side lifts the membrane (7) including the moulding (40) off the valve seat (4) until the pilot opening (47) again comes into the area of the closing device (8). However, the pilot opening (47) is not sealed completely—a pressure compensation through the membrane (7) is always possible through a gap which is either permanently open or which opens and closes periodically. For this, the membrane (7) is stationary in this intermediate setting between the completely open and completely closed positions. Accordingly water can flow between the membrane (7) and the valve seat (4). If the DC motor (39) is again supplied with electric current in the same sense then this process is repeated. Initially the closing device (8) lifts off the pilot opening (47a) of the moulding (40). Due to the resulting pressure changes the membrane (7) moves further away from the valve seat (4) until the pilot opening (47) is again closed by the closing device (8) to the extent that the valve achieves a stationary, stable position. In this way the entire characteristics of the valve can be passed through continuously between the fully closed and the fully open setting.

Figure 4:
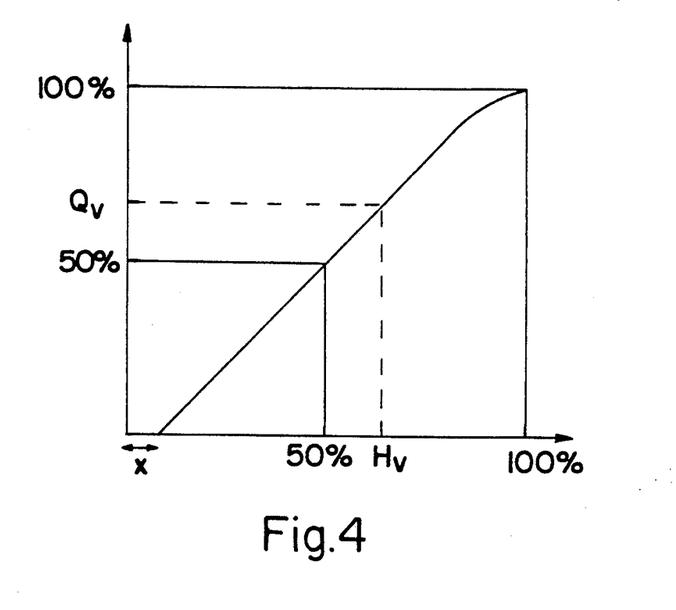
FIG. 4: a schematic diagram of the opening characteristic of the pilot controlled valve shown in FIG. 2.

The relation of quantities between the opening stroke and the relevant water flow rate in the valve is shown schematically in FIG. 4. As this illustrates clearly, the relationship between these two variables is not in fact completely linear, but very nearly so. A certain starting movement "x" is required for the water to start flowing. This initial stroke is a consequence of the elasticity of the material used for the closing device (8) or for the membrane (47) respectively.

With the polarity of the voltage assumed above to be applied to the DC motor (39) there is a movement of the plunger (9) and therefore the closing device (8) in an upward direction according to the drawing, i.e. in the direction of opening. For this, the characteristic of the valve shown in FIG. 4 is passed through from the bottom left to the top right whereby fundamentally any point on the curve could be set as a stable position.

If electrical current of the opposite polarity is now applied to the DC motor (39) then the drive shaft (36) and the gear (37) rotate in the opposite direction. Accordingly the screw section (33) is moved axially in the opposite direction, i.e. downwards. The closing device (8) follows this downward movement under the influence of the spring (13), whereby the ring (32) remains in contact with the screw part (33). The closing device (8) now seals the pilot opening (47a) in the moulding (40). The water which flows through the pressure compensation opening (17) into the pressure compensation chamber (19) raises the pressure in the pressure compensation chamber (19). As the surface area of the membrane affected by the pressure of the pressure compensation chamber (19) is greater than the area pointing in the opposite direction which is subject to the pressure of the water on the inlet side, the water in the pressure compensation chamber (19) presses the membrane (17) towards the valve seat (4). The pilot opening (47a) is now partially released again so that pressure compensation can take place through the membrane (7) and a new stable condition is taken up in which the membrane (7) is located closer to the valve seat (4).

Also in the direction of closing, i.e. from top right to bottom left in FIG. 4, every point in the characteristic shown in FIG. 4 can be set to be stable.

Figure 3:
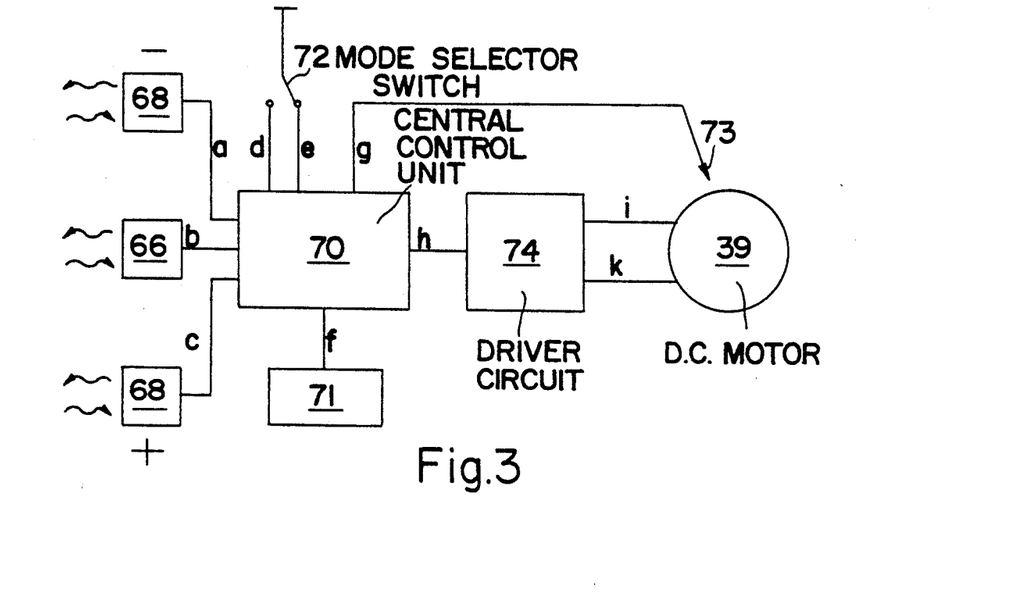
FIG. 3: a block circuit diagram of an embodiment for a circuit for operating the sanitary fitting in FIG. 1.

The type of electric drive for the valve shown in FIG. 2 is now to be explained with the aid of FIG. 3. This shows a schematic block circuit diagram of the circuit configuration.

FIG. 3 again shows the front sensor (66) directed towards the user as well as the two side sensors (68) which are connected to a central control unit (70) through the leads (b or a and c respectively). A memory (71) is connected to the central control unit (70) through a lead (f). The leads (d and e) lead from the central control unit to a mode selector switch (72) whose operation will be explained later. A further lead (g) leads from the central control unit (70) to a position sensor (73) which outputs a signal representing the position of the closing device (8). Details of the position sensor (73) are not of interest in this case. In the design example shown in FIG. 2 the position sensor (73) has a magnetic marking on a reference wheel (29) which is set in rotation by the gear (37). The magnetic marking operates together with a reed contact (not shown) whereby if necessary a counter detects the number of full revolutions completed.

On a lead (h) the central control unit (70) generates an output signal which is applied to a driver circuit (74). The rules involved here will be discussed later. According to the commands which are input through the lead (h) this generates voltage signals on the leads (i, k) which are applied to the DC motor (39).

The precise operation of the circuit configuration described here is as follows:

Let us initially consider the case in which the mode selector switch (72), as shown in the drawing, is connected with the lead (3). The mode selected in this case is to be considered as that used for normal operation, in which therefore the sanitary fitting carries out its normal function.

At the outset let the valve shown in FIG. 2 be closed. The closing device (8), as stated above, is located at the pilot opening (47) and the membrane (7) is at the valve seat (4). The position sensor (73) generates a signal corresponding to this closed position.

If a user enters the area monitored by the front sensor (66) then this generates a signal on the lead (b) to the central control unit (70). This instructs the driver circuit (74) through the lead (h) to supply the DC motor (39) through the leads (i and k) with a DC voltage of such polarity that the closing device (8) is lifted off the pilot opening (47), i.e. moving upwards in FIG. 2. As already explained above in great detail this causes the valve to open. The opening movement is monitored by the position sensor (73). When the closing device (8) reaches a position which corresponds to the opening stroke previously stored in the memory (71) the central control unit (70) terminates through the lead (h) the DC current signal output by the driver circuit (74) on the leads (i and k). The DC motor (39) stops. An opening stroke shown as HV in FIG. 4 has been reached.

If a user enters the area monitored by the front sensor (66) the valve does not therefore open fully (stroke = 100%) but only to a preferred position HV which corresponds to a preferred flow rate QV. This preferred flow rate QV is matched to the "normal requirements", i.e. a flow capacity which generally coincides with the needs of the user. In most cases therefore the sanitary fitting can be operated at this preset opening setting.

However, if the user wishes to use a flow rate different to the preferred flow rate QV then he moves one hand closer to one of the two side sensors (68). One of these sensors (68+) is allocated to an increase in the flow rate (at the bottom in FIG. 3, marked with a plus symbol) and the other (−68) is allocated to a reduction in the flow rate (at the top in FIG. 3, marked with a minus symbol).

In the above it is assumed that the user wishes a further increase in the flow rate. He therefore moves his hand close to the lower side sensor (68+) shown in FIG. 3. This sends a corresponding signal through the lead (c) to the central control unit (70). The central control unit (70) causes the driver circuit (74), through a command on the lead (h), to apply a current to the DC motor (39) through the leads (i and k) for the opening direction for as long as the hand is located in the area of the side sensor (68+). However, the output signal of the driver circuit (74) is shut off at the latest when the full opening stroke is reached (monitored by the position sensor (73)).

However, if the user requires a lower flow rate than the preferred value QV then he moves his hand to the side sensor (68−). The output signal on the lead (a) causes the central control circuit (70) to give the driver circuit (74) the following command through the lead (h): Drive the DC motor (39) through the leads (i and k) with a polarity such that the drive motor (39) moves in the closing direction. In this case also, the output signal of the driver circuit (74) is present at the DC motor (39) for as long as the hand is in the area monitored by the side sensor (68—). However, the output signal of the driver circuit (74) is shut off at the latest when reaching the stroke "0", monitored by the position sensor (73).

If the user leaves the area monitored by the front sensor (66) then its signal on lead (b) disappears. Then the central control unit (70) instructs the driver circuit (74) through the lead (h) to move the DC motor (39) back to the completely closed position by suitable signals on the leads (i and k). The position sensor (73) again monitors the fully closed position at which the membrane (7) is again on the valve seat (4) and the pilot opening (47) is sealed by the closing device (8).

The following special feature is worthy of mention with respect to the form of the output signals from the driver circuit (74) on the leads (i and k):

Whenever these output signals appear after a change in the signal status on the lead (b) at the output of the front sensor (66) they are uninterrupted continuous signals. The DC motor (39) is therefore moved into the position required (either the preferred stroke HV or the position "0") in the fastest possible manner.

However, if the output signals of the driver circuit (74) on the leads (i and k) are the consequence of the output signals from the side sensors (68) on the leads (a and c) then this involves pulsed signals, whereby the ratio between the pulse and the gap can amount to approx. 1:10. This greatly reduces the speed of movement of the DC motor (39) which allows for a finer adjustment of the flow rate required.

If the mode selector switch (72) is set so that it is connected to the lead (d) then the operation of the sanitary fitting is identical apart from the following exception: A flow rate set by means of the side sensors (68) is entered in the memory (71) as the new preferred flow rate QV at the same time. In this mode of operation therefore the required flow rate QV can be selected to which, in the first mode of operation explained (mode switch (72) connected to lead (e)), the motor (39) moves at the highest possible speed when the user enters the area monitored by the front sensor (66).

Figure 6:
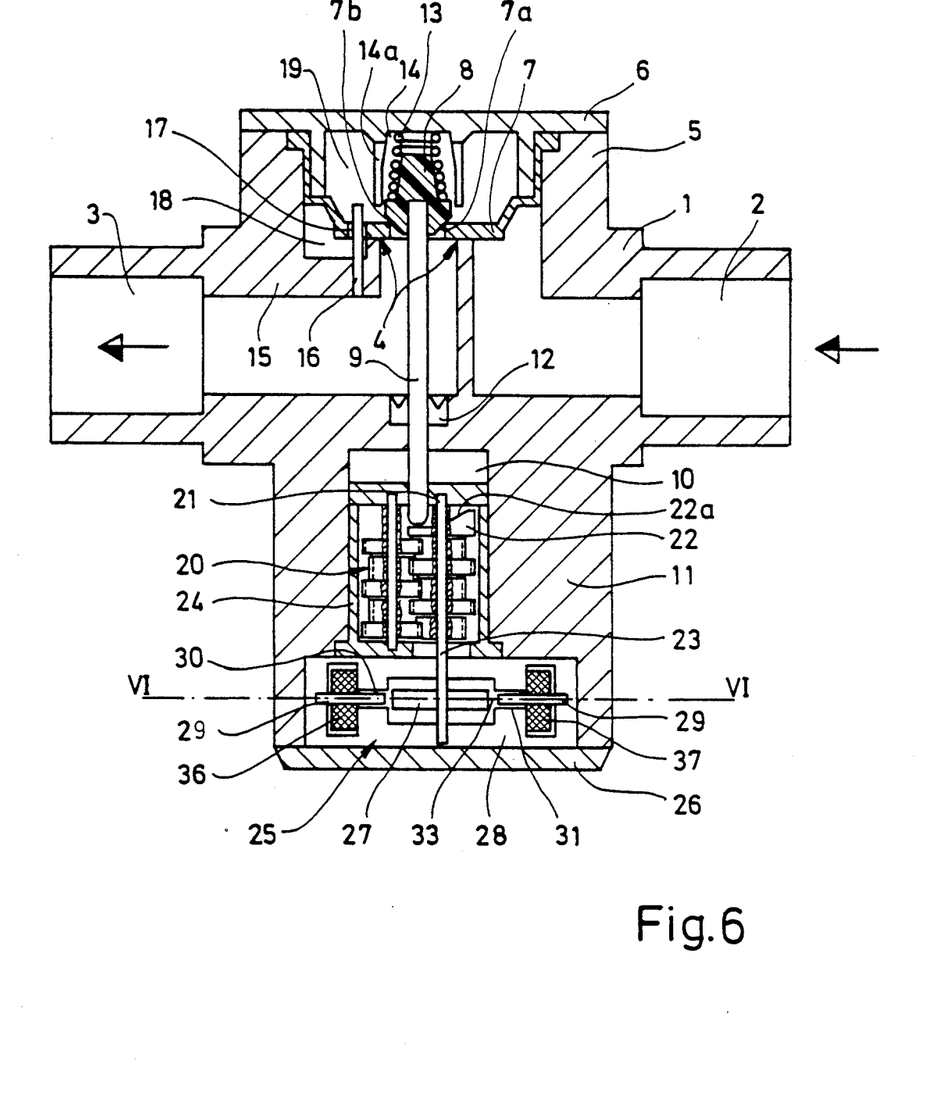
FIG. 6: an axial cross-section through a second embodiment of a pilot controlled valve which is used in the sanitary fitting shown in FIG. 1.

FIG. 6 shows a second embodiment of a pilot controlled valve which can be used in the sanitary fitting in FIG. 1. It differs from the embodiment in FIG. 2 mainly because an electric stepping motor is used in place of a DC motor. The conditions are otherwise largely identical and the relevant parts are therefore identified with the same references.

The pilot controlled valve includes a casing (1) with an inlet opening (2) and an outlet opening (3). In the flow path between the inlet (2) and the outlet (3) there is a valve seat (4) permanently fixed to the casing and onto which a cup shaped membrane (7) is fitted. This is located in a casing area (5) which is covered by a lid (6). The membrane (7) is clamped with its edge between the lid 86) and the edge of the casing area (5) and seals the casing (1) against the outside.

The membrane (7) has a central pilot opening (7a) which can be closed by a closing device (8) located between the membrane (7) and the lid (6). The closing device (8) is fitted on the end of a plunger (9) which passes through the pilot opening (7a) in the membrane (7) and ends in a chamber (10). This is provided in a second casing area (11) opposite the first casing area (5). In the casing wall which seals the chamber (10) there is an opening and a seal (12) for the plunger (9).

The closing device (8) is under the pressure of a thrust spring (13) which is supported against the lid (6). Several shoulders on the lid (6) restrict the opening movement of the membrane (7).

Radially outside the valve seat (4) there is a pressure compensation opening (17) provided on the membrane (7) which connects a chamber (18), in turn connected to the inlet opening (2), to a pressure compensation chamber (19) formed between the membrane (7) and the lid (6). In order to minimise the free cross-section of the pressure compensation opening (17) a pin (16) which is fixed in a casing wall (15) protrudes through it.

A gear (20) is mounted in the chamber (10). This is combination of a reduction gear and a curved gear. The gear (20) is provided in a gear casing (24) which is fully inserted into the chamber (10). On the fixed output shaft (21) of the gear (20) there is, in addition to other gear wheels, a rotating cam (22) whose curved area (22a) is located on one of the side surfaces of the cam (22). The drive shaft (23) at the opposite end of the gear (20) leads out of the gear casing (24) and into the casing of an adjacent electric stepping motor (25). The drive shaft (23) of the gear (20) is also the output shaft of the stepping motor (25).

Inside the casing (28) of the stepping motor (25) there is a rotor (27), a flat circular disc of a high performance magnet. The direction of magnetisation runs in the direction of a diameter of the rotor disc (27). In the casing (28) there is also a stator (29) of soft iron. The stator (29) is flat, just like the rotor (27), and surrounds the rotor (27) in its plane.

Figure 8:
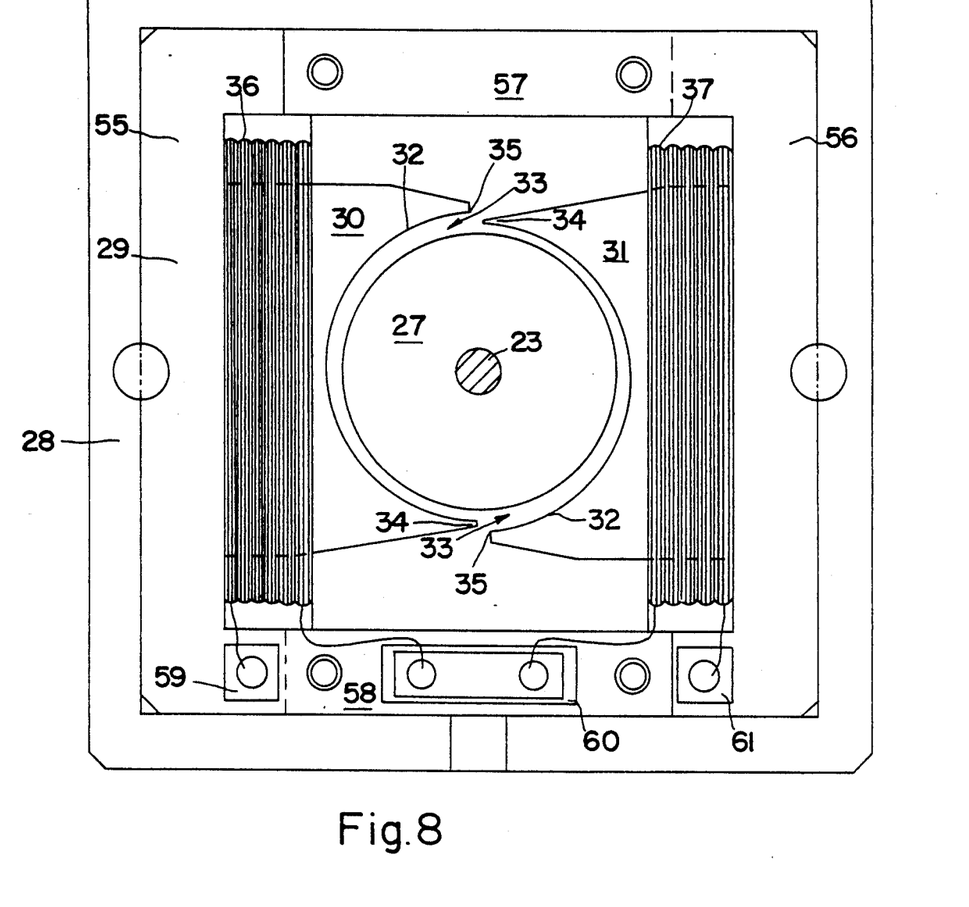
FIG. 8: a cross-section through the stepping motor which forms part of the valve shown in FIG. 4 or FIG. 5.

FIG. 8 shows a view into the opened stepping motor (25). The stator (29) surrounds the rotor (27) whose shaft (23) is mounted in the wall of the casing (28) with two pole shoes (30 and 31) which have approximately semi-circular cut-outs (32). The two pole shoes (30 and 31) are eccentric with respect to the position of the shaft (23) so that air gaps (33) result between the circumference of the rotor and the pole shoes (30 and 31). From the one tip (34) to the other (35) both the pole shoes (30, 31) gradually become wider and therefore determine the direction of rotation of the rotor (37). This rotates in the direction in which the air gap (33) increases. The shoes (30 and 31) are connected together through the side legs (57 and 58) of the stator and, thus, magnetically closed. Together with the stator (29), the side legs (57 and 58) form a frame configuration which completely surrounds the rotor (27) in its main plane and allows only minor stray fluxes out.

The pole shoes (30 and 31) each carry a winding (36 or 37 respectively). The two windings are in opposite directions and are connected in series. The connection points (59 und 60) as well as the connection point (60) of the two windings (36 and 37) are located on one of the legs (58) of the stator (29).

The valve described above operates as follows:

If an electrical pulse is applied to the windings (36 and 37) of the stepping motor (35) then this causes the motor (37) to rotate through a certain angle, in a two pole rotor (as shown) through a half revolution. For this, the cam (22) is rotated. During this rotation the end of the plunger (9) slides on the angled surface (22a) of the cam (22) and is pushed back against the resetting force of the spring (13). The closing device (8) lifts slightly off the pilot opening (7a) of the membrane. The processes now take place in the same way as described above for the first embodiment, illustrated with the aid of FIG. 2.

Again the entire characteristics of the valve can be passed through between the fully closed and fully open position (in this case in steps), whereby the number of steps is given on the one hand by the polarity of the rotor and on the other by the type of the gear (20).

The stepping motor (25) described above is uni-directional, i.e. it rotates in just one direction. Thus, if the valve is to be closed again the cam (33) is turned further by the stepping motor (25) until the plunger (9) passes through the valve's fully open position and is closed again by the falling surface of the cam (22). Thus the closing device (8) seals the pilot opening (7a) in the membrane (7) under the pressure of the thrust spring (13).

The type of electrical drive for the valve described with the aid of FIGS. 6 and 7 in the sanitary fitting shown in FIG. 1 will now be explained with the aid of FIG. 5a. This shows a schematic block circuit diagram of the corresponding circuit configuration.

The first (front) sensor (66) is connected to a first logic circuit (72). This is fitted so that if an object enters the area monitored by the first sensor a quite specific number of pulses appear at the output lead. These pulses are applied to a driver curcuit (70) which generates corresponding pulses of a suitable voltage and amplitude and applies them to the windings of the stepping motor (25). In this way when an object enters the area monitored by the first sensor (66) the valve is moved to a predetermined opening position. Conversely, when the object leaves the area monitored by the first sensor (66) a corresponding number of pulses is generated in the first logic circuit (72) and these are used to drive the stepping motor (25) back to the fully closed position. Through the sensor (66) therefore a similar method of operation of the sanitary fitting is possible as is used in existing fittings operating with digitally switching solenoid valves. When an object approaches, water flows at a very specific quantity or at a very specific temperature.

However, if the user is not satisfied with the water quantity provided then he moves his hand close to the second side sensor (68). As long as a hand or another object is in the area monitored by the sensor (68) a second logic circuit (74) generates pulses which are in turn applied to the driver circuit (70). The driver circuit (70) uses these to generate the pulses required for operating the stepping motor (25). On the whole the configuration is therefore such that the stepping motor (25) continues its movement in steps with the pulses for as long as the object is located in the area monitored by the sensor (68). When the water flow rate required has been reached the user removes his hand from the area monitored by the sensor (68).

Figure 5A:
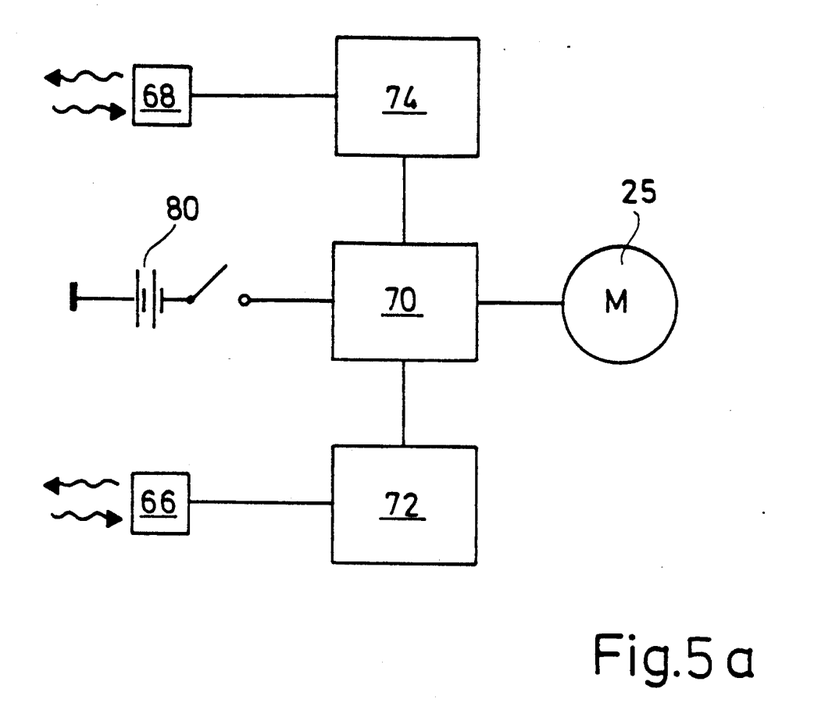
FIG. 5a: the block circuit diagram of a first embodiment of a circuit configuration for operating the sanitary fitting in FIG. 1 when using a uni-directional stepping motor.

With the uni-directional stepping motor (25) described with the aid of FIGS. 5a and 6 it is not always possible to "directly" control the required quantity of water because a change in the position of the membrane is initially only possible in one direction and a reversal of the movement is only possible after reaching the end of the plunger stroke. Nevertheless the use of such a uni-directional stepping motor (25) provides considerable advantages with respect to the cost and the power required.

Figure 5B:
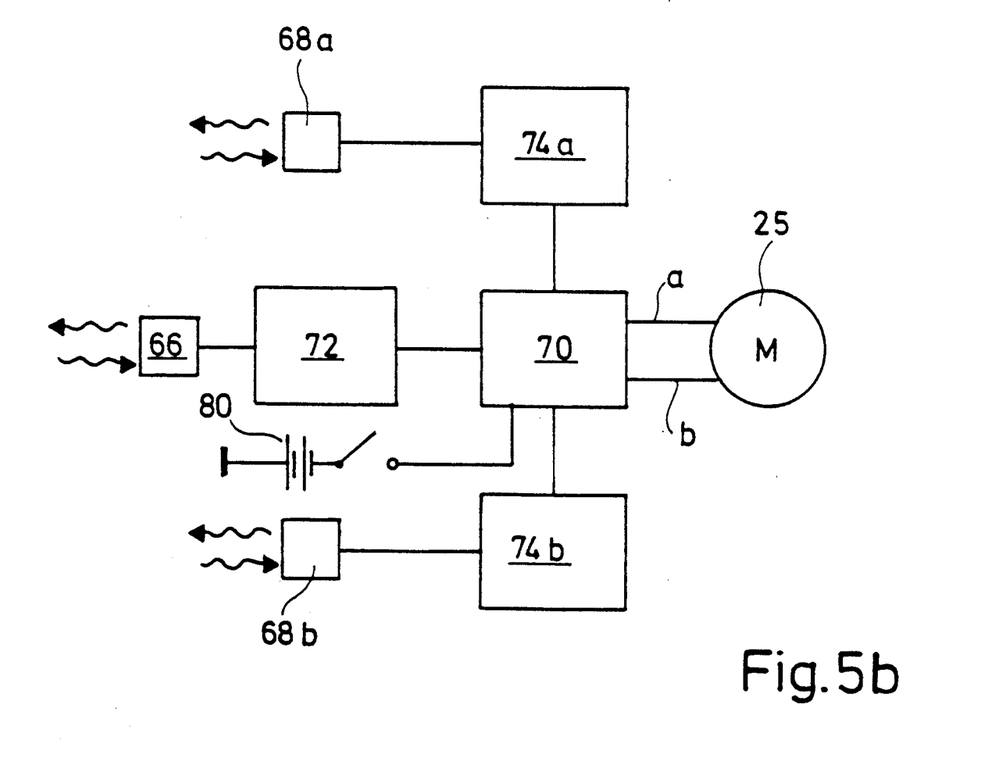
FIG. 5b: a block circuit diagram of an embodiment for a circuit configuration with a bi-directional stepping motor.

FIG. 5b shows a block circuit diagram of a configuration which is suitable for operating a bi-directional stepping motor (25). The precise construction of this stepping motor is not of interest for this description. It is sufficient to know that two different types of pulses can be applied to this bi-directional stepping motor (25) which differ either in their polarity or, as shown, in the type of connections (a and b) of the current windings.

The function of the first, front sensor (66) is the same as that stated above in the design example described with the aid of FIG. 5a. If an object enters the relevant monitoring area then the first logic circuit (72) generates a certain number of pulses which are converted in the driver circuit (70) into corresponding pulses suitable for operating the stepping motor (25). These pulses are applied to the stepping motor (25) on the lead (a) which means that the stepping motor (25) is turned in the opening direction until a certain pre-programmed water flow rate is achieved.

When the object leaves the area monitored by the sensor (66) a number of pulses is generated accordingly and these are applied to the stepping motor (25) through the lead (b). This moves the valve to the closed position again.

If the user wishes to change the flow rate in one direction when the valve is open (for more water, for example) then he moves his hand towards the sensor (68a) located on one side of the fitting. As soon as the hand reaches the area monitored the first logic circuit (74a) generates pulses which are converted by the driver circuit (70) and are fed through the lead (a) (direction of opening) to the stepping motor (25). The valve opens accordingly.

However, if the user requires less water then he moves his hand towards the sensor (68b) on the opposite side of the sanitary fitting. As soon as the hand reaches the area monitored by the sensor (68b) a further logic circuit (74b) generates pulses which are again converted in the driver circuit (70) and are applied on the lead (b) to the stepping motor (25). This moves the stepping motor (25) in the direction towards the closed position. The water flow rate changes accordingly.

In the above description it is assumed that only one flow of water is to be regulated. Of course the circuit according to FIG. 3 as well as the circuits according to FIGS. 5a and 5b can be doubled so that with separate valves, separate stepping motors (25) and separate sensors (68) both the quantity and the temperature of the mixed water flowing out can be adjusted. The front, first sensor (66) only needs to be provided once however. This is used to allow a pre-programmed quantity of mixed water to flow at a pre-programmed temperature.

Figure 7:
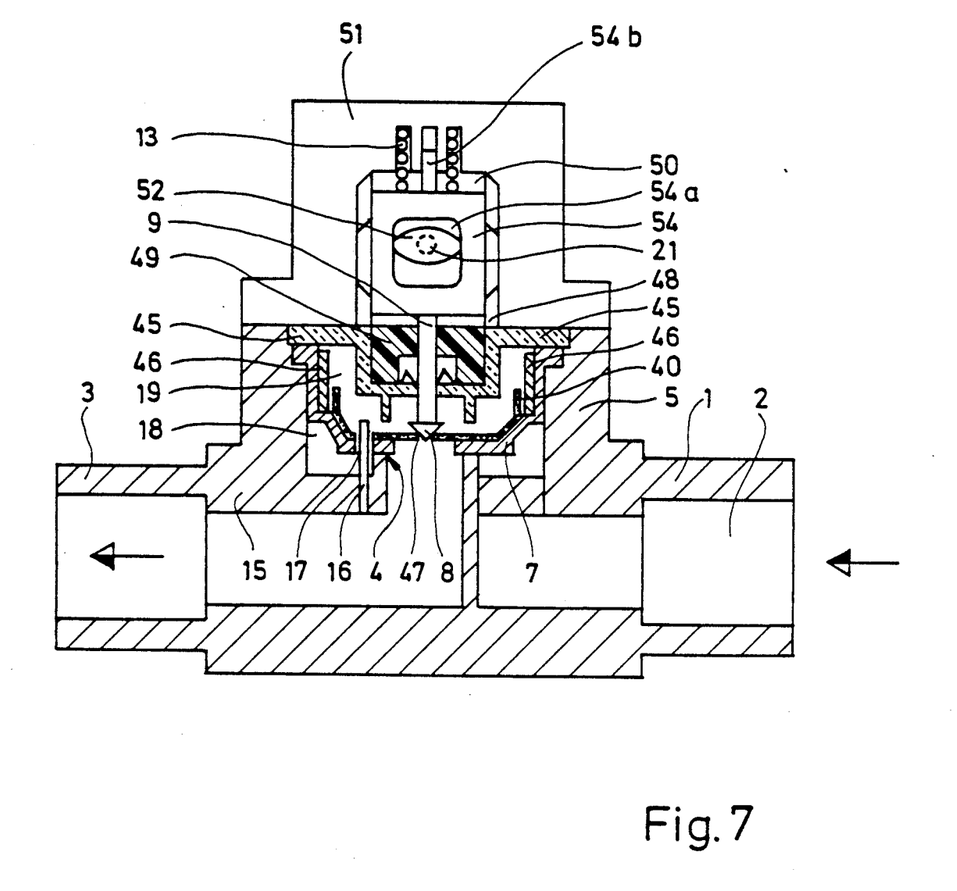
FIG. 7: a further embodiment of a suitable pilot controlled valve.

FIG. 7 shows a further embodiment of a valve. While in the valve according to FIG. 6 the membrane (7) and the gear (20) are located on opposite sides of the flow path in the valve casing (1) this is different in the embodiment according to FIG. 7. In this case a membrane (7) is provided in a casing area (5) above the valve seat (4). A nozzle shaped moulding (40) is attached to the side of the membrane (7) away from the valve seat (4). The edge of the membrane (7) is clamped between one shoulder of the casing area (5) and a cup shaped insert (45). A ring (46) holds a cylindrical section located at the edge of the membrane (7) against the cylindrical inside wall of the casing area (5). The moulding (40) possesses a central pilot opening (47) which is positioned coaxially to a larger central opening (7a) in the membrane (7). The pilot opening (47) can be closed by a conical closing device (8) mounted at the end of a plunger (7). This is located completely on the side of the moulding (40) away from the valve seat (4) and passes through the insert (45), a seal (48) provided in the insert (45) and a fixing (49) holding the seal in the insert (45), into a chamber (50). The latter is located in a shoulder (51) provided on the casing area (5). This is where the gear (20) and the stepping motor (25) are located. Of the gear (20) itself, only an elliptical cam (52) permanently fitted to the end of the drive shaft is shown. The remainder of the gear (20) and the stepping motor (25) lie behind the area shown in FIG. 7 in the shoulder (51).

The cam (52) is fitted in a guide (54) which is secured at the rear end of the plunger (9). The guide (54) is slidably mounted in the longitudinal direction of the plunger (7) in the chamber (50) and has a cut-out (54a) which in a section lying at right angles to the drive shaft (21) and longitudinal to the plunger (9) is approximately square in its cross-section. The side length of the square approximately coincides with the length of the main axis of the cam (52). The guide (54) is controlled on the one hand by the plunger (9) and on the other by a pin-like extension (54b) which extends in alignment with the plunger (9) on the side of the guide (54) opposite to the plunger (9), and which is fitted into a suitable hole in the shoulder (51). This extension (54b) is surrounded concentrically by a thrust spring (13) which affects the guide (54), presses the closing device (8) against the moulding (40) and moves its pilot opening (47).

Both in the embodiment according to FIG. 6 as well as in that according to FIG. 7 the design of the control curve which converts the rotary movements of the stepping motor (25) into the linear movement of the plunger (9) ensures that the opening characteristic of the valve is as linear as possible.

What is claimed:

1. A sanitary fitting which can be controlled to provide continuously variable water flow without physical contact which comprises in combination
    (A) a valve located in the path of water flow through said fitting,
    (B) valve moving means operatively connected to said valve so that said valve can be moved from a completely open position to a completely closed position,
    (C) at least one sensor operatively connected to said valve moving means so that within a given monitoring area movement will actuate said valve moving means which in turn will change the position of said valve,
the improvement comprising that
    (1) said valve being a pilot controlled valve that includes
       (a) a membrane (7) and a valve seat (4) which acts in conjunction with the membrane (7), said membrane having a pilot opening (7a, 47) and moves relative to the valve seat according to the water pressure on either side of it,
       (b) a closing device (8) for said pilot opening (7a, 47),
       (c) a plunger (9) which is attached to said closing device (8) and which is adapted to move in a linear manner so as to cause said closing device (8) to either allow water flow through said pilot opening (7a, 47) or prevent water flow through said pilot opening (7a, 47), and
    (2) said valve moving means comprising
       (a) an electric motor (25, 39) having an output shaft (38) that rotates, and
       (b) a device (32, 33, 20) which converts the rotary movement of the output shaft (38) into a linear movement of the plunger (9).

2. A sanitary fitting according to claim 1 wherein two sensors (68+, 68−) are provided, so that when an object enters the monitoring area of one sensor (68+) the electric motor (38; 25) will move in a direction to increase the water flow and if an object enters the monitoring area of the other sensor (68−) the electric motor (38; 235) will move in a direction to reduce the water flow.

3. A sanitary fitting according to claim 1 wherein two independent pilot controlled valves are provided, one of which serves to adjust the cold water flow and the other to adjust the hot water flow, and at least one separate sensor is allocated to each.

4. A sanitary fitting according to claim 2 wherein an additional sensor (66) is provided, whereby if an item enters the monitoring area of the additional sensor (66) all valves are moved in a priority opening stroke (HV) and when the item leaves the monitoring area all valves are moved into the closed position.

5. A sanitary fitting according to claim 4 wherein in one mode of operation the two sensors (68a, 68b) which serve to increase or reduce the water flow can be used to adjust the preferred opening stroke (HV).

6. A sanitary fitting according to claim 1 wherein the electric motor (39) is a DC motor.

7. A sanitary fitting according to claim 6 wherein the DC motor (39) supplies one of the two sensors (68+, 68−) with pulsed DC current if an object enters the monitoring area.

8. A sanitary fitting according to claim 1 wherein the electric motor is a stepping motor (25) whose output shaft (23) turns through a specific angle for each electrical pulse received.

9. A sanitary fitting according to claim 8 wherein the stepping motor is uni-directional and only one sensor (68) is provided to change the position of the valve.

10. A sanitary fitting according to claim 8 wherein the stepping motor (25) is bi-directional.

* * * * *